US010586307B2

(12) United States Patent
Shen et al.

(10) Patent No.: US 10,586,307 B2
(45) Date of Patent: *Mar. 10, 2020

(54) CAPTURING REAL-TIME VIDEO WITH ZOOMING CAPABILITY AND SCANNING HIGH RESOLUTION STILL IMAGES OF DOCUMENTS USING THE SAME APPARATUS

(71) Applicant: Pathway Innovations and Technologies, Inc., San Diego, CA (US)

(72) Inventors: Ji Shen, San Diego, CA (US); Dongbing Zhang, Shanghai (CN)

(73) Assignee: Pathway Innovations and Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/948,650

(22) Filed: Jul. 23, 2013

(65) Prior Publication Data

US 2014/0160535 A1    Jun. 12, 2014

Related U.S. Application Data

(63) Continuation of application No. 13/506,208, filed on Apr. 4, 2012, now Pat. No. 8,508,751, which is a (Continued)

(51) Int. Cl.
*H04N 1/00* (2006.01)
*G06T 3/40* (2006.01)
(Continued)

(52) U.S. Cl.
CPC .................. *G06T 3/40* (2013.01); *G06F 3/14* (2013.01); *H04N 1/00204* (2013.01);
(Continued)

(58) Field of Classification Search
CPC ............... H04N 1/393; H04N 1/19594; H04N 1/00559; H04N 1/00535; H04N 5/23296; H04N 3/1562; H04N 5/3454; G06T 3/40
(Continued)

(56) References Cited

U.S. PATENT DOCUMENTS 5,894,529 A    4/1999 Ting
6,744,109 B2    6/2004 Barton
(Continued)

FOREIGN PATENT DOCUMENTS

DE    20019927 U1    4/2001
DE    10156317 A1    7/2002
(Continued)

OTHER PUBLICATIONS

European Search Report in corresponding Patent Application No. 11737562.6, dated Sep. 20, 2013.*
(Continued)

*Primary Examiner* — Eric A. Rust
(74) *Attorney, Agent, or Firm* — Trevor Coddington; Insigne LLP

(57) ABSTRACT

Disclosed is a method of acquiring an image of a target to provide an output video image that has a plurality of frame images. The method includes the steps of receiving a series of frame images from a video camera, using a processor to manipulate the series of frame images, which includes determining a reference resolution for providing output frame images, and displaying and/or storing the manipulated series of frame images as the output video image without changing a resolution of the output frame images. Also disclosed is a document imaging apparatus that includes a digital imaging unit. The digital imaging unit contains optics that having an infinite focal length. The document imaging apparatus also includes a processor that is coupled to the
(Continued)

digital imaging unit and that is configured to cause the digital imaging unit to zoom in or zoom out in real-time while maintaining a resolution value of stored images constant. A non-transitory storage medium stores images obtained from the digital imaging unit and a display displays the stored images. A folding suspension arm supports the digital imaging unit at a distance from a target to be imaged.

9 Claims, 9 Drawing Sheets

Related U.S. Application Data continuation of application No. PCT/US2011/022549, filed on Jan. 26, 2011.

(60) Provisional application No. 61/298,912, filed on Jan. 28, 2010.

(51) Int. Cl.
| | | |
|---|---|---|
| H04N 1/195 | (2006.01) | |
| H04N 1/393 | (2006.01) | |
| G06F 3/14 | (2006.01) | |
| H04N 5/341 | (2011.01) | |
| H04N 5/345 | (2011.01) | |
| H04N 5/232 | (2006.01) | |

(52) U.S. Cl.
CPC ..... *H04N 1/00535* (2013.01); *H04N 1/00559* (2013.01); *H04N 1/19594* (2013.01); *H04N 1/393* (2013.01); *H04N 5/341* (2013.01); *H04N 5/3454* (2013.01); *H04N 5/23296* (2013.01); *H04N 2201/0041* (2013.01); *H04N 2201/0049* (2013.01); *H04N 2201/0436* (2013.01)

(58) Field of Classification Search
USPC ......................................................... 358/1.1
See application file for complete search history.

(56) References Cited

U.S. PATENT DOCUMENTS

| | | | |
|---|---|---|---|
| 6,965,460 B1 | 11/2005 | Gann | |
| 7,148,911 B1 | 12/2006 | Mitsui | |
| 7,239,338 B2 | 7/2007 | Krisbergh | |
| RE42,898 E | 11/2011 | Shimizu et al. | |
| 2001/0012051 A1 | 8/2001 | Hara | |
| 2004/0080658 A1* | 4/2004 | Cambou | H01L 27/14618 348/340 |
| 2004/0119869 A1* | 6/2004 | Tretter | H04N 5/23245 348/335 |
| 2004/0174444 A1 | 9/2004 | Ishii | |
| 2004/0218099 A1* | 11/2004 | Washington | H04N 5/77 348/571 |
| 2005/0078052 A1 | 4/2005 | Morichika | |
| 2005/0149364 A1* | 7/2005 | Ombrellaro | A61B 5/103 705/3 |
| 2005/0177783 A1 | 8/2005 | Agrawala et al. | |
| 2005/0206912 A1 | 9/2005 | Megawa | |
| 2005/0243073 A1* | 11/2005 | Hashimoto et al. | 345/184 |
| 2006/0012830 A1 | 1/2006 | Aiso | |
| 2006/0171583 A1* | 8/2006 | Lee | G03H 1/268 382/154 |
| 2006/0277393 A1 | 12/2006 | Wu et al. | |
| 2006/0282850 A1* | 12/2006 | Kim | H04N 5/57 725/38 |
| 2007/0002463 A1* | 1/2007 | Shintani | G02B 7/282 359/717 |
| 2007/0041448 A1* | 2/2007 | Miller | H04N 19/61 375/240.18 |
| 2007/0121068 A1* | 5/2007 | MacDougall | A61B 3/113 351/221 |
| 2008/0021928 A1* | 1/2008 | Yagnik | G06F 17/241 |
| 2008/0025646 A1* | 1/2008 | Aguera y Arcas | G06F 17/30277 382/305 |
| 2009/0051768 A1* | 2/2009 | DeKeyser | H04N 7/18 348/143 |
| 2009/0067724 A1 | 3/2009 | Hirohata | |
| 2009/0141163 A1* | 6/2009 | Attar | H04N 5/23212 348/345 |
| 2009/0262200 A1* | 10/2009 | Takabatake | G06F 1/1616 348/207.1 |
| 2010/0067811 A1* | 3/2010 | Ye | H04N 19/134 382/233 |
| 2010/0122168 A1* | 5/2010 | Silberstein | G11B 27/034 715/719 |
| 2010/0165120 A1* | 7/2010 | Chang | H04N 5/2251 348/207.99 |

FOREIGN PATENT DOCUMENTS

| | | |
|---|---|---|
| EP | 1 524 847 A2 | 4/2005 |
| JP | 2005123708 A | 5/2005 |
| JP | 2008-294676 A | 12/2008 |
| WO | WO 03/083805 A1 | 10/2003 |

OTHER PUBLICATIONS

European Search Report in corresponding European Patent Application No. 11737562.6 dated Sep. 20, 2013.
English Abstract of JP2005123708 (A) dated May 12, 2005.
English Abstract of JP20082946 (A) dated Dec. 4, 2008.
Supplementary European Search Report of EP 11737562.6 dated Oct. 9, 2013.

* cited by examiner

CAPTURING REAL-TIME VIDEO WITH ZOOMING CAPABILITY AND SCANNING HIGH RESOLUTION STILL IMAGES OF DOCUMENTS USING THE SAME APPARATUS

This is a continuation application claiming the benefit of non-provisional application U.S. Ser. No. 13/506,208 filed Apr. 4, 2012 which claims the benefit under 35 U.S.C. § 365(c) of International Application PCT/US2011/022549 filed Jan. 26, 2011, and also of provisional patent application No. 61/296,912 filed on Jan. 28, 2010, the contents of each are hereby incorporated by reference in their entirety.

FIELD

The disclosure generally relates to document cameras and to the field of document scanning apparatuses, and methods for both capturing real-time video with zooming capability and scanning high resolution still images of documents using the same apparatus.

BACKGROUND

In the field of document cameras, it is desirable for an apparatus to capture real-time video streams with the highest clarity possible with zooming-in and zooming-out capability. Prior art of this field have achieved zoomable video directly output to video projectors with video resolution normally in Video Graphics Array ("VGA") range of 640× 480 or Super VGA (SVGA) 800×600 display resolution range and rarely can reach a resolution as high as 1920×1280 without drastically increasing the cost needed to build such as device.

Such a limitation often comes from the limited resolution of video display projectors and the processing capacity of the electronic components which must support the document camera's ability to directly out put analog video signal to the projector. In order for a document camera based on prior art to capture real-time video with high resolution images, high quality tele-focal lens assembly must be employed to zoom in and/or out on the object of interest to compensate the limitation in the electronic circuitry responsible for sensing, generating, and outputting frames of images in a video stream. Such limitation in the electronic circuitry of document cameras based on prior art makes it unsuitable for capturing high resolution still images required for document archiving, copying and display applications. The necessary employment of an optical lens assembly makes it mandatory for these document cameras to often have elaborate motorized housing for the lenses, which results inevitably in relatively heavy structural configurations requiring considerably sized bottom panels serving as both a stabilizing plate and a housing for the electronics. Due to such reasons, these document cameras take away significant desktop space and have less than desirable portability. As an example, a prior art digital document camera is commercially available from an unbranded international OEM supplier, is shown in FIG. 1.

Other document scanning prior art methods teach methods of flatbed scanners or scanning assembly working in conjunction with a motorized document feeder to capture high resolution images often in the range of 150 dpi to 600 dpi range. FIG. 2 shows a typical flatbed scanner apparatus, such as a ScanJet 5590 Digital Flatbed Scanner by Hewlett Packard. However, such an apparatus must require a platen of certain minimum dimensions, which can accommodate various sizes of commonly used paper, and must have significant height in order to accomplish the scanning functions in their enclosed housing of the various mechanical and electronic scanning components. As the size of paper to be scanned gets larger, the size of the traditional scanners will also have to be larger. Such an apparatus is not space efficient and often has poor portability.

Additionally, prior art scanners do not have any ability to capture real-time video of any objects, and almost impossible to capture any images of three dimensional objects. These scanners select a sub-area within a preview image of the document ahead of time, which requires a pre-scan of the document and therefore takes longer than a desirable amount of time. Scanning of paper documents is also time consuming ranging from approximately 6 seconds in highly expensive professional grade scanners to 12 to 80 seconds in order to finish a Legal sized document.

U.S. Pat. No. 6,965,460 B1 describes a look-down digital imaging device having a linear sensor for imaging a raster line of an original image placed substantially below the look-down device, and achieving the capture of a relatively high resolution image by sweeping a raster line across the scan area in the same fashion of a flatbed scanner, also with the aid of a video camera device housed in the same housing unit. Although the apparatus described in this reference suspends the imaging unit on a stand, the time cost, electronic components, mechanical components, and potentially motorized components necessary in tilting and sweeping the raster line across the entire surface area of a target while capturing the reflected linear line sequentially one line at a time, were not fully disclosed. It is conceivable that the scanning time consumed to sweep the raster line across the entire scanning area can be similar to and not significantly better than the time required by commercial available flatbed scanners. However, this reference does not address the need for speed efficiency gains over existing flatbed scanners. The employment of a second assisting video camera required in the prior art increases the volume and weight of the housing unit. In another aspect, by requiring the inclusion of multiple components, such as the zoomable lenses, the linear scanning components, and the video camera, this reference is not advantageous in achieving sufficient compactness in possible embodiments of the apparatus described.

U.S. Pat. No. 6,540,415 B1 describes a stand with a hinged housing unit which can hold in place a fully self-contained, ready-made, commercially available digital camera, which closely resembles a point-and-shoot camera. As commercial digital camera products vary in design form factors, output connection technologies, control button accessibilities, and built-in imaging functions, this reference may not be adaptable to many possible variations to make a commercial embodiment practical or advantageous in real life applications.

SUMMARY

Recent advancements in electronic image sensing technologies, such as CMOS or CCD sensors, and in compact optical lenses, supported by wide commercial adoption of compact digital cameras in cellular phones, personal desktop computers, laptop computers, and myriad other portable computing devices, has reduced the cost of digital imaging optical and sensor units dramatically. The latest webcam like digital camera imaging units are highly compact in terms of form factor, and can capture images with resolutions ranging from 2 mega-pixel to 10 mega-pixel instantaneously with one click for an entire US Legal sized paper surface area, and more importantly with costs at a fraction of what they used to be. Pixel resolution will increase beyond mega-pixel as much as 30 mega-pixels and higher, while costs continue to stay low at the current level as demand for high resolution digital imaging units remains strong. With 9 to 10 mega-pixel image sensing ability in the digital imaging units, one can capture a digital image with native resolution equivalent to approximately 300 dots per inch (dpi) scanned in image of a US Legal sized document. With 30 mega-pixels and above image sensing ability, one can even approach near 600 dpi native resolution for scanning a US Legal sized document.

Recent developments of personal computing devices have made PC's and other personal computing devices nearly ubiquitously available in most developed and developing countries. The presence of such personal computing devices has become a necessary and indispensable part of virtually every home and professional office. The application of a document imaging device in accomplishing common document capturing tasks becomes naturally and necessarily connected to personal computing machines, such as a PC or Macintosh computer.

In view of the aforementioned, a desire exists for a document imaging system that is cost efficient, highly compact or space efficient, highly portable, and virtually instantaneous in terms of time efficiency, while at the same time, also being capable of producing real-time high resolution zoomable video and being capable of capturing high resolution still images of documents with one click "scan" processing. As an example, a user can keep the system on a commonly used desk surface, without consuming more than approximately 10 square inches of surface area, and can put a document or a 3D object under the facing-down image sensing unit of virtually any size or shape, and be able to click one button to snap a high resolution image of the object. At the same time, the user can transport the apparatus to a classroom setting to visually presenting instructional materials through a connected projector on a large screen, with real-time video, while maintaining the ability to zoom in and out on the object.

A further desire exists for the compact document imaging system to be fully self-contained with internally integrated and fully controllable image or video sensing and processing units, without externally combining or fitting with any other self-contained product, such as a commercial point-and-shoot digital camera. For example, such a compact and self-contained nature shall enable a business user to easily carry the system in a briefcase or other travel sized bag.

Disclosed is a method of acquiring an image of a target to provide an output video image that has a plurality of frame images. The method includes the steps of receiving a series of frame images from a video camera, using a processor to manipulate the series of frame images, which includes determining a reference resolution for providing output frame images, and displaying and/or storing the manipulated series of frame images as the output video image without ever changing a resolution of the output frame images.

Alternative embodiments of the method also include the step of executing the manipulation in an amount of time short enough so that the manipulation step is not perceived by a user, i.e., in real time. Typically, manipulation in real time would be such that the manipulation would cause no more than a delay of twenty milliseconds between the time that the user enters a command and the command is executed. Additional steps of the alternative embodiments include identifying a first resolution for the received plurality of frame images and identifying a second resolution for the reference resolution. In the case of a manipulated frame image having a higher resolution, as manipulated, than the second resolution, reducing the resolution of the frame image to that of the second resolution; and in the case of the manipulated frame image having a lower resolution, as manipulated, than the second resolution, using the processor to further manipulate the frame image to reduce pixilation. The disclosed method will work whether the processor is housed in an external personal computer or if it is housed in an apparatus that contains all of the disclosed components.

When the processor manipulates the frame image, manipulation can be any one or more of re-sizing the image, panning the image in a selected direction, rotating the image in a selected direction, or annotating the image. If the image is resized it can also be annotated at the same time that it is being re-sized, panned while being re-sized, panned while being rotated, etc. Any combination of manipulations will not change the resolution of the output image frames.

A different method of acquiring an image of a target includes the steps of determining a reference resolution at which each frame image of the series of frame images will be maintained and storing the reference resolution in a non-transitory medium. A video image comprising a series of frame images is captured and an external processor is used to compare a resolution of each frame image of the video image with the reference resolution and the resolution of each frame image is adjusted to correspond to the reference resolution. After comparing the resolution of each frame image, each frame image on a display is stored and/or displayed in real-time. Also, a selected portion of the image of the frame can be re-sized at any time to provide a visual effect of rotating the image in three dimensions.

Also disclosed is a document imaging apparatus that includes a digital imaging unit. The digital imaging unit contains optics having an infinite focal length. The document imaging apparatus also includes a processor that is coupled to the digital imaging unit and that is configured to cause the digital imaging unit to zoom in or zoom out in real-time while maintaining a resolution value of stored images constant. A non-transitory storage medium stores images obtained from the digital imaging unit and a display displays the stored images. A folding and telescoping suspension arm supports the digital imaging unit at a distance from a target to be imaged. The processor of the apparatus can be housed in the folding suspension arm or in an external personal computer.

BRIEF DESCRIPTION OF THE
ACCOMPANYING FIGURES

FIG. 3b illustrates a component of the embodiment shown in FIG. 3a;

DETAILED DESCRIPTION OF THE EMBODIMENTS

Figure 1:
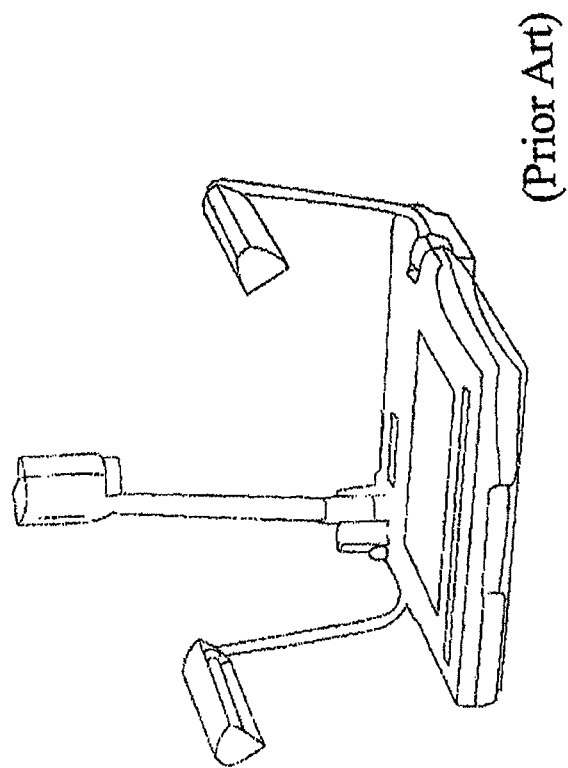
FIG. 1 is an illustrative example of a prior art document camera device.
Figure 2:
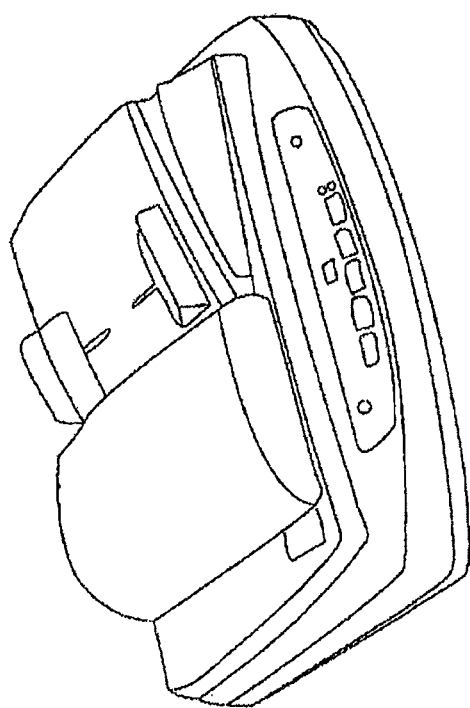
FIG. 2 is an illustrative example of a prior art flatbed scanner.
Figure 3A:
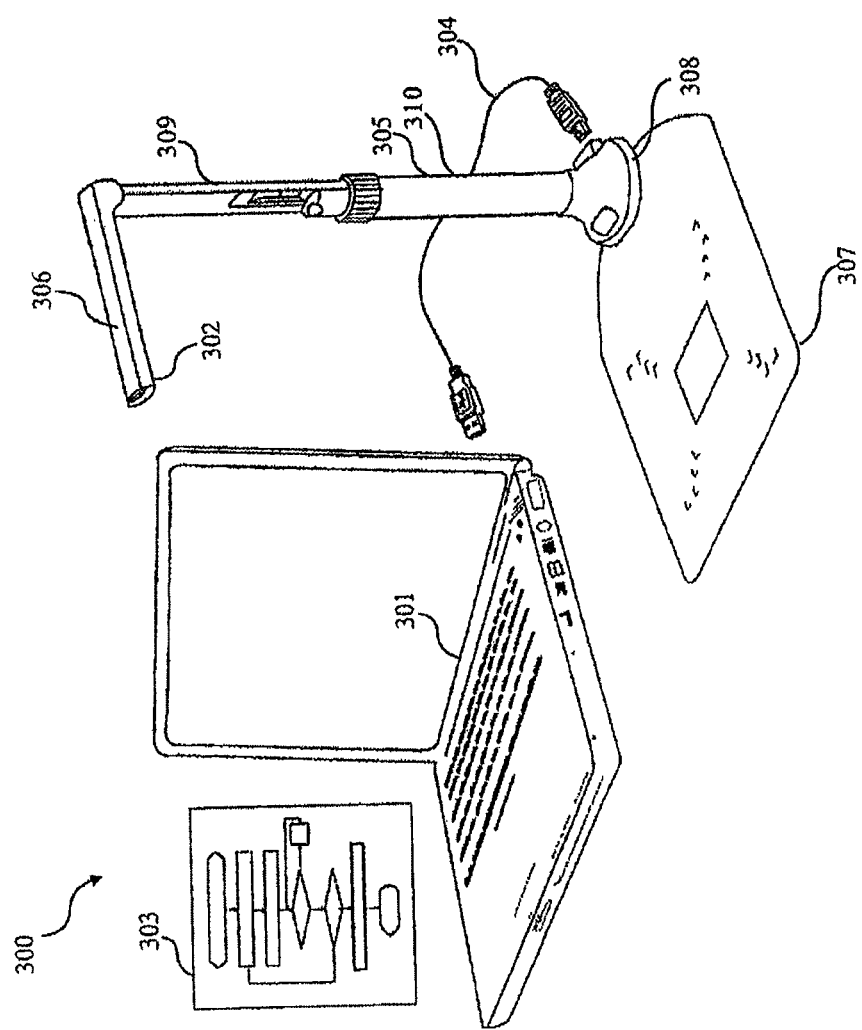
FIG. 3a is a drawing of an embodiment of the present disclosed system.

With reference to FIG. 3a, a Document Imaging System 300 is fully integrated with a Personal Computing Device, briefly referred to as a Personal Computer (PC) 301 in a fashion that the Software Programming Unit (SPU) 303 executed within the PC controls and implements the primary functions of the Document Imaging System 300 in software instruction code, while communicating with a miniaturized Digital Image Sensing Unit (DISU) 302, in full duplex fashion. The SPU 303 thus becomes the master or core unit, and the DISU 302 becomes a slave or auxiliary unit of the Document Imaging System. This ensures that functionality of the system can be made available to users in far more interactive and friendly ways comparing small control buttons on traditional electronic devices, while streamlining the configuration of the DISU 302 to an optimal level.

The DISU 302 communicates with the SPU 303 residing in a PC 301 via a high speed digital connection (named as USB for illustration purpose) 304, such as USB 2.0, USB 3.0, FireWire/IEEE 1934 400 or IEEE 1934 800. The SPU receives electric power from the PC 301 via the same digital connection, for the necessary imaging sensing processing functionality, without mandatorily requiring an external power source. The highly compact Document Imaging System 300 includes a built-in illuminating light source, with its power source also primarily supplied by the PC 301 through the same USB connection 304, while an external powerful source unit is only optional.

The DISU 302 is supported by a highly compact camera stand 305 with a folding suspension arm 306 that houses the DISU 302 along with an image processing electronic circuitry board 314 (shown in FIG. 3b) and supported by a weighted small profile base 308. The Document Imaging System could also be optionally augmented by including a flexible positioning mat 307, which has predefined markings to assist users in positioning the camera stand 305, and the paper document to be "scanned" or visualized.

Figure 3B:
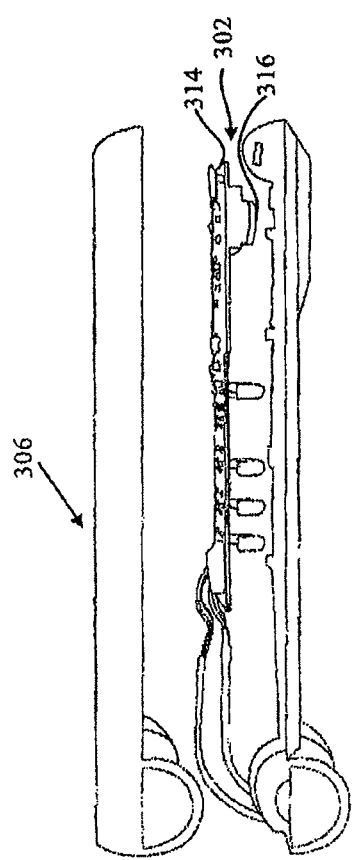
Figure 3C:
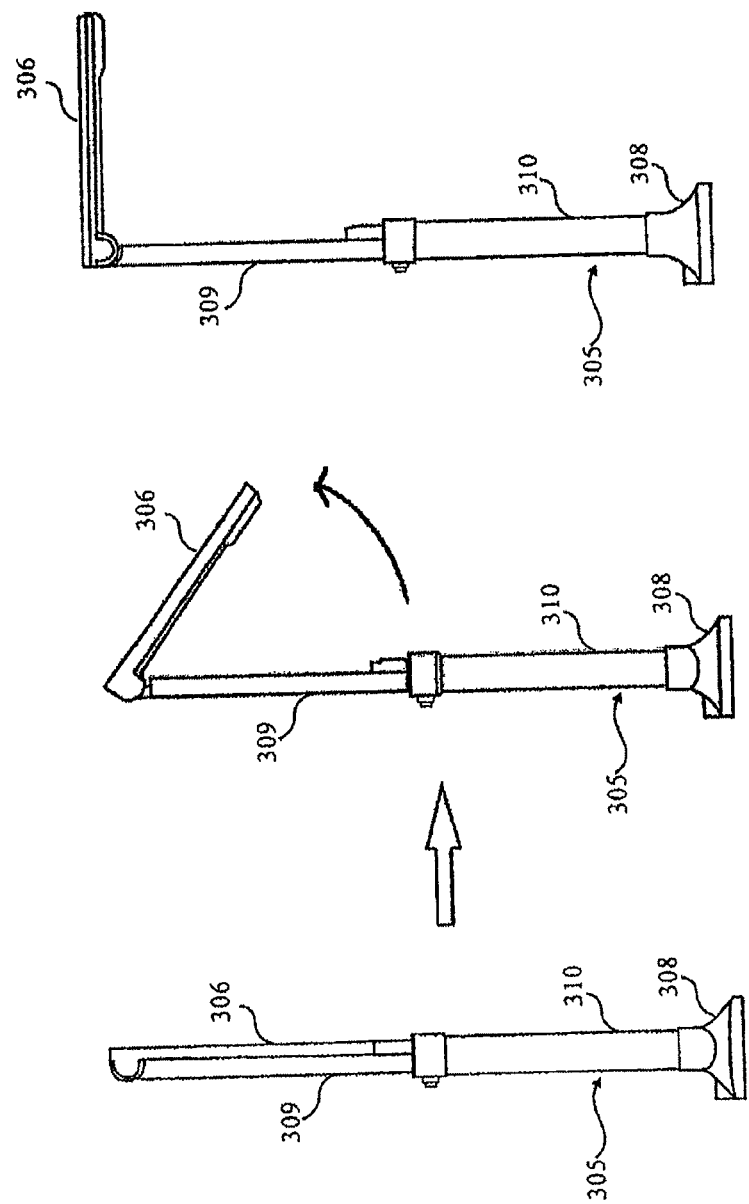
FIG. 3c illustrates the embodiment shown in FIG. 3a in various configurations.

With reference to FIG. 3b, the DISU 302 comprises a miniaturized optical lens 316 along with a digital image sensor (not separately shown), and has a resolution of minimum of three mega-pixels and can reach 20 to 30 mega-pixel range resolutions. The optical lens 316 and the accompanying electronic components are capable of capturing real-time video at approximately 30 frames per second with High Definition (HD) resolution, while being able to capture still pictures of the objects under the camera lens at the same time. The optical lens 316 has limited zoom range or can be a fixed focal lens. The depth of field of the DISU 302 lens however has a wide range of above 100 cm, ensuring objects appearing under the facing-down DISU 302 appear focused and sharp even when the DISU is substantially far away. Such a small imaging unit is as light as less than 1 oz in weight. Hence, the need for a large volume housing unit is eliminated. The DISU 302 can be easily encased in a highly compact space. For example, the embodiment of the DISU housing as shown in FIGS. 3a-3c can be as small as only 2.5 cm×5 cm×20 cm and in some embodiments even smaller.

Figure 3D:
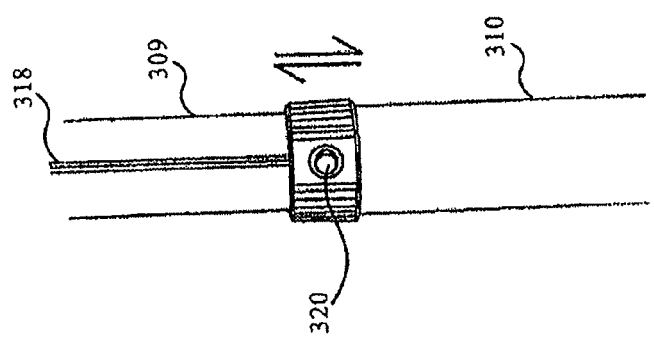
FIG. 3d illustrates a relationship between a top part and a bottom part of a compact camera stand.

The entire housing assembly including the electronic circuitry is encased in the folding suspension arm 306. For example, the embodiment shown in FIGS. 3a-3d is no more than 20 cm in length. In one possible embodiment of the present system, the upright portion of the stand has two tube shaped parts: top part 309 and bottom part 310 with the top part 309 being inside the bottom part 310. The top part 309 can move up and down so that when it is moved down, the total height of the stand can be reduced, hence the entire device 300 becomes smaller in size and easier to transport. The telescoping relationship is shown in FIG. 3d. The presence of groove in combination with an internal tooth (not shown), groove 318, and actuating lock 320 help a presenter raise and lower the top part 309 without having to substantially readjust the suspension arm 306 to reacquire the target.

The lightweight DISU encasing further makes it possible for the base of the camera stand to be free standing instead of fastened to any desk surface, while maintaining stability only by including certain heavy matter like cast-iron weight matter. Therefore, the complete external apparatus encasing the DISU 302 is highly compact, lightweight, free standing with a folding suspension arm, which makes the apparatus highly portable.

Displaying real-time video preview with zooming-in and zooming-out is achieved by the SPU 303's instruction to the DISU 302 to capture and transmit a continuous stream of frames of images of a minimum of 2 mega-pixel resolution, via a high speed data connection such as USB 2.0, which for example, has raw data speed of 480 MB/s. Each 2 mega-pixel or above frame of image is captured in one instantaneous snapshot of the entire surface area, without the need of line by line scanning, and has a resolution of at least 6× the resolution of a VGA display often found in projectors. With an embodiment of 5 mega-pixel DISU lens resolution which allows for capturing images of significantly higher resolution than traditional products, the resolution of the present system will always be higher than the resolution of a display screen, for example, wherein the video frames are 16× the resolution of a VGA monitor. The SPU 303 executing within the PC can display the captured video frames at enlarged or reduced sizes at the user's control through a pointer device or keyboard, for example, using the mouse wheel to enlarge or shrink image sizes. Additional manipulation of the image to increase resolution even further could include background filtering and advanced interpolation, up to combining multiple images into "super resolution" images.

Since the captured images are most often multiple times larger than the resolution of most computer monitor screens, the changes in image display sizes achieve the effect of zooming-in or zooming-out in real-time, digitally in computer software. For higher than actual sized magnification, an extrapolation algorithm can be employed to enlarge the original images with a certain level of pixelation effect, but achieves several magnitudes of higher magnification. At the same time, a user can click one button displayed in user interface software constructs to capture a still image of equally high resolution image of the object appearing under optical lens, so that in an embodiment having a 5 mega-pixel lens, the still image of a letter sized page can reach approximately 300 dpi resolution. Ultimately, as imaging resolution increases to 20 to 30 mega-pixel range, one can achieve image resolution approaching near 600 dpi. The SPU 303 software processing can also auto-crop to trim off unwanted color around the edges of the target document, and straighten the images, remove glare spots, in real-time or in offline mode, to further reduce any need to adjust the lens assembly to aim or preset a scan area.

Figure 4:
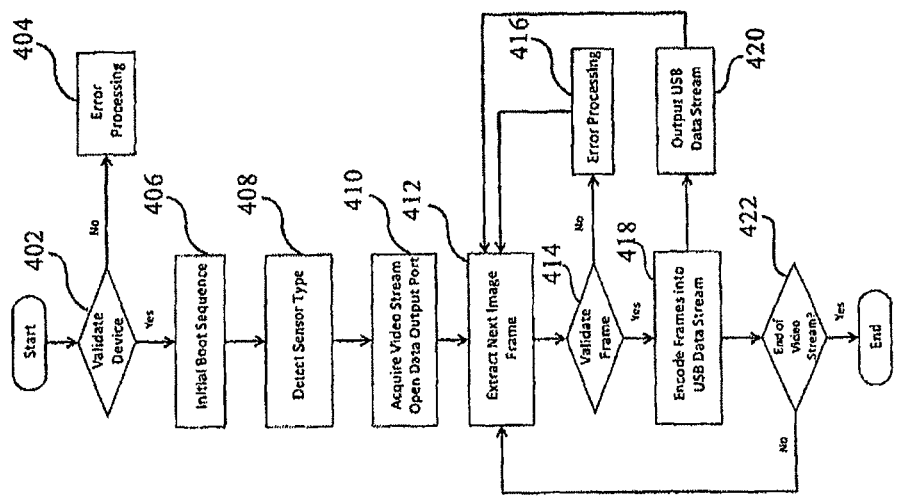
FIG. 4 is a flow chart detailing steps for executing the present system and method.
Figure 5:
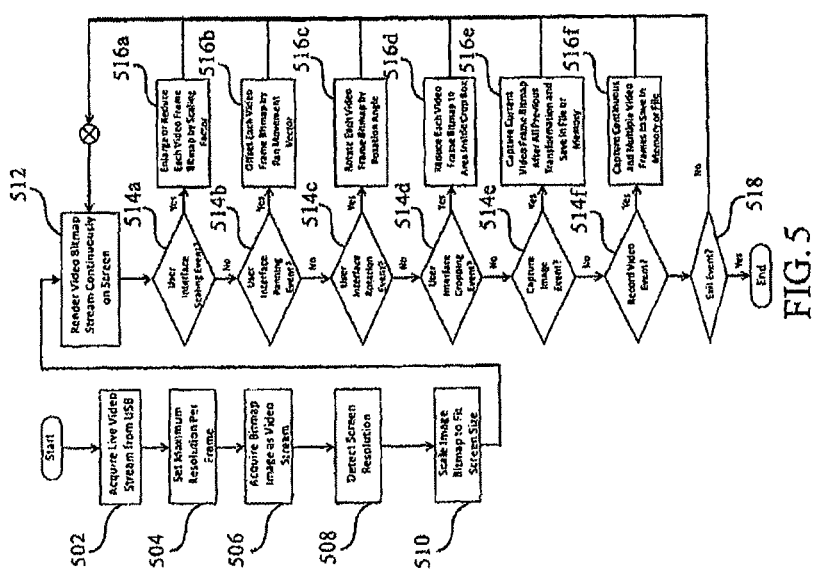
FIG. 5 is a flow chart depicting additional steps in the operation of the present system and method.

As shown in FIG. 4, the inventive method includes a variety of different operations that can be performed in a variety of sequences; however, the order shown in FIGS. 4 and 5 is preferred. Step 402 is a decision step wherein the DISU is validated. If the DISU is invalidated, the system moves to operation step 404 for error processing; however, if the DISU is validated, the system moves to operation step 406, which is the initial boot sequence. After the system is booted, an output resolution of the sensor is selected at step 408. At steps 410 and 412, the system acquires a video stream that contains a plurality of video frame images and opens a data output port. Frame validation occurs at decision step 414. If there is a problem with the frame image, the system proceeds to step 416 for error processing; however, if the frame image is acceptable, the frame is encoded into a USB data stream at step 418, the USB data stream is outputted (at operation step 420) and steps 412 through 420 are repeated until the end of the video stream is reached (at decision step 422).

With reference to FIG. 5, the process shown in FIG. 4 continues to step 502 wherein live video stream from the USB is acquired. A maximum resolution per frame image is set and step 504 and a bitmap image is acquired as a video stream at step 506. A resolution of a display screen is determined at step 508 and the bitmap image is scaled to fit the display screen size at step 510. Beginning at operation step 512, a video bitmap stream is continuously rendered on the display screen. The user can select any of the functions that are shown in decision steps 514a-514f.

At decision step 514a the system determines whether the user has selected a scaling (re-sizing) event. If the user has selected a scaling event, each video frame is enlarged or reduced at operation step 516a by the requested amount. At decision step 514b the system determines whether the user has selected a panning (scrolling) event. If the user has selected a panning event, the system at step 516b offsets each frame image by a vector that is proportional to a magnitude that has been requested by the user. At decision step 514c, the system determines whether the user has selected a rotation event; if so, the system at step 516c rotates each frame image by an angle that is proportional to the magnitude of rotation selected by the user. At decision step 514d, the system determines whether the user has selected a cropping event. If the user has selected a cropping event, the system proceeds to step 516d and each image frame is reduced such that only the area inside of a crop box will be displayed on the display screen. At decision step 514e, the system determines whether an image event is being captured, i.e., whether a screen shot is being requested, if so, at operation step 516e, the system will capture whatever frame image is displayed during the time of the request and/or shortly thereafter and before the request and will save the frame image in a file or memory. At decision step 514f the system determines whether a video event is being recorded. If the answer to decision step 514f is yes, the system at step 516f will capture multiple continuous frame images to save in a memory or file for later playback. Also it is useful to note that the system can continually look for user interfaces (at step 518) that would prompt decision steps 514a-514f, the system can intermittently look for such user interfaces and/or the user can look for these user interfaces only upon request by the user.

Figure 6:
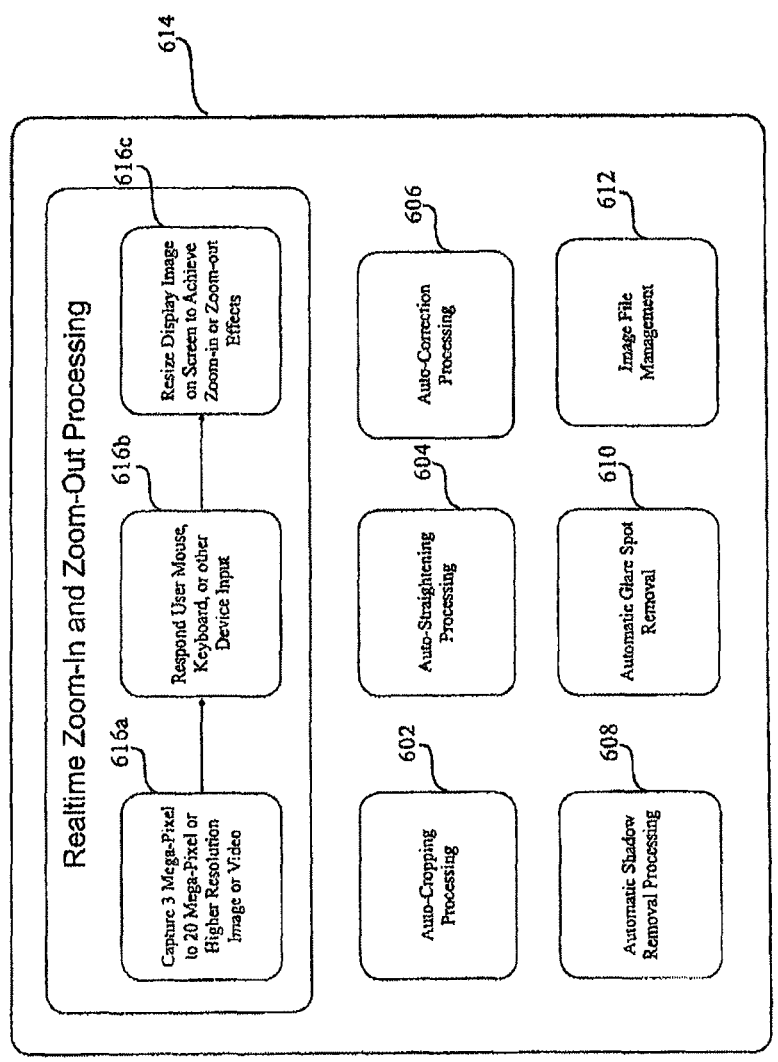
FIG. 6 illustrates a display screen showing additional features of the present system and method.

Additional features of the present system are shown in FIG. 6. Non-user controlled features such as auto-cropping processing 602, auto straightening processing 604, auto-correction processing 606, auto-shadow removal processing 608, automatic glare spot removal 610 and image file management 612 are available to a user via touch sensitive display screen 614 or other user interface means. Also, commands 616a, 616b, and 616c can be manually selected by the user.

By offloading the processing of zooming functions to the SPU 303 software on PC 301, the present system has eliminated the need for an optical zoom lens assembly, which is high cost and considerably heavy. Instead, an externally attached apparatus can use very lightweight optical components such as one might find in a camera equipped mobile telephone or an infinite focal length digital camera, and with much reduced electronic or firmware processing. Such an integrated system of real-time image processing software working in conjunction with the external digital imaging unit, allows achievement of all of the desired properties, as mentioned previously, to include, displaying real-time video preview with a high zoom capability. The system can be configured to provide a minimum of 6× zooming-in and zooming-out, and at the same time capturing high resolution still images of 300 dpi resolution, all the while maintaining a physical unit that is highly space efficient, lightweight, of a small base foot-print of no more than 10 square inches, compact and highly portable. Such configuration of a single DISU 302 achieves the above stated desirable features without the need for an extra video camera, required in the prior art, for the purpose of assisting in and preparing for the image capturing with preview, alignment, or pre-selection of scan area.

The present system offloads zooming and other optical functions from the lens assembly to the integrated computer software processing unit using digital zooming and other image processing techniques, coupled with a miniaturized high resolution image sensing unit capable of taking a full page picture instantaneously and HD real-time video within the same unit. The present system is also highly compact and lightweight, thereby enabling a high degree of portability and space-efficiency. Furthermore, the system and method are novel in the aspect that they fulfill functions of both document camera systems and document scanner devices and presentation and video display devices, hence the device described in the present system is recognized by popular computer operations systems, such as Microsoft Windows®, Mac OS X®, or Linux®, as a dual identity device, currently as a USB connected web camera device and a TWAIN scanner device at the same time. The dual identity aspect of the device qualifies the system in the present invention as a new device category, which we consider as Camera-Scanner devices.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, one or more elements can be rearranged and/or combined, or additional elements may be added. Thus, the present invention is not intended to be limited to the embodiments shown herein but is to be accorded the widest scope consistent with the principles and novel features disclosed herein.

We claim:

1. A method of displaying real-time video with zooming-in and zooming-out capability, the method comprising the steps of:
receiving, at a computer, a continuous stream of video frame images from an image sensor within a portable document camera external to the computer, wherein the document camera is coupled to the computer, wherein the continuous stream of video frame images comprises video frame images of a document, and wherein the continuous stream of video frame images is at least 30 frames per second, wherein the image sensor has a resolution of 5 mega-pixels or higher, and wherein the image sensor is less than 1 oz in weight, wherein the portable document camera is recognized by an operating system of the computer as a USB Connected Web Camera Device and as a TWAIN Scanner Device, and wherein the portable document camera further comprises a camera stand,
a flexible positioning mat with predefined markings to assist a user in positioning the camera stand, and
a folding suspension arm comprising electronic circuitry encased in the folding suspension arm;
enlarging or reducing size of the received continuous stream of video frame images at the computer;
auto-cropping color around one or more edges of the video frame images of the document;
straightening the video frame images of the document;
removing glare spots from the video frame images of the document;
displaying, at the computer, the enlarged or reduced size continuous stream of video frame images to achieve the effect of zooming-in or zooming-out in real-time, wherein the steps of enlarging or reducing, and displaying, are performed at a user's control through use of a mouse wheel;
displaying, at a user interface at the computer, a button to capture a still image; and
during display of the enlarged or reduced size continuous stream of video frame images, capturing, at the computer, the still image from the continuous stream of video frame images in response to the user's click of the button.

2. The method of claim 1 wherein the still image has a resolution of 5 mega-pixels or higher.

3. The method of claim 1 wherein the computer is a personal computing device.

4. The method of claim 3 wherein the document camera is coupled to the personal computing device by a USB connection.

5. The method of claim 1 wherein the resolution of the received continuous stream of video frame images is greater than a display resolution of the computer.

6. The method of claim 1 wherein the portable document camera comprises an illuminating light source with its power source supplied by the computer.

7. The method of claim 1 wherein the image sensor has a depth of field of at least 100 cm.

8. A document imaging system for displaying real-time video with zooming-in and zooming-out capability, the system comprising:

a personal computing device; and
an image sensor disposed within an external, portable document camera, the image sensor configured to couple to the personal computing device via a digital connection extending therebetween, wherein the portable document camera is recognized by an operating system of the personal computing device as a USB Connected Web Camera Device and as a TWAIN Scanner Device, wherein the image sensor has a resolution of 5 mega-pixels or higher, wherein the image sensor is less than 1 oz in weight, and wherein the portable document camera further comprises
a camera stand,
a flexible positioning mat with predefined markings to assist a user in positioning the camera stand, and
a folding suspension arm comprising electronic circuitry encased in the folding suspension arm;
the system characterized in that the personal computing device is configured to:
receive, at the personal computing device, a continuous stream of video frame images from the image sensor, wherein the continuous stream of video frame images comprises video frame images of a document, and wherein the continuous stream of video frame images is at least 30 frames per second;
enlarge or reduce the size of the received continuous stream of video frame images, at the personal computing device;
auto-crop color around one or more edges of the video frame images of the document;
straighten the video frame images of the document;
remove glare spots from the video frame images of the document;
display, at the personal computing device, the enlarged or reduced size continuous stream of video frame images to achieve the effect of zooming-in or zooming-out in real time, wherein the enlarging or reducing, and displaying, are performed at a user's control through use of a mouse wheel;
display, at a user interface at the personal computing device, a button to capture a still image; and
during display of the enlarged or reduced size continuous stream of video frame images, capture, at the personal computing device, the still image from the image sensor continuous stream of video frame images in response to the user's click of the button.

9. The system of claim 8 wherein the image sensor has a depth of field of at least 100 cm.

* * * * *